(12) United States Patent
Scouller et al.

(10) Patent No.: US 10,296,427 B2
(45) Date of Patent: *May 21, 2019

(54) FAST WRITE MECHANISM FOR EMULATED ELECTRICALLY ERASABLE (EEE) SYSTEM

(71) Applicant: NXP USA, Inc., Austin, TX (US)

(72) Inventors: Ross S. Scouller, Austin, TX (US); Melody B. Caron, Austin, TX (US); Jeffrey C. Cunningham, Austin, TX (US)

(73) Assignee: NXP USA, Inc., Austin, TX (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/704,155

(22) Filed: Sep. 14, 2017

(65) Prior Publication Data

US 2018/0004616 A1  Jan. 4, 2018

Related U.S. Application Data

(63) Continuation of application No. 14/829,877, filed on Aug. 19, 2015, now Pat. No. 9,792,191.

(51) Int. Cl.
*G06F 11/00* (2006.01)
*G06F 11/20* (2006.01)
*G06F 12/02* (2006.01)
*G06F 3/06* (2006.01)

(52) U.S. Cl.
CPC ........ *G06F 11/2069* (2013.01); *G06F 3/0619* (2013.01); *G06F 3/0647* (2013.01); *G06F 3/0685* (2013.01); *G06F 11/2087* (2013.01); *G06F 12/0246* (2013.01); *G06F 2201/805* (2013.01); *G06F 2212/1032* (2013.01); *G06F 2212/7203* (2013.01); *G06F 2212/7205* (2013.01); *G06F 2212/7209* (2013.01)

(58) Field of Classification Search
CPC .................................................. G06F 11/2069
USPC ... 714/6.21, 6.22, 6.23, 6.24, 6.1, 6.31, 6.32
See application file for complete search history.

(56) References Cited

U.S. PATENT DOCUMENTS 4,930,101 A * 5/1990 Wong ....................... B41J 29/20
  358/1.6
5,371,709 A * 12/1994 Fisher ...................... G11C 5/143
  365/226
6,304,981 B1 * 10/2001 Spears .................. G06F 11/004
  714/22

(Continued)

*Primary Examiner* — Dieu Minh T Le
(74) *Attorney, Agent, or Firm* — Senaida B. San Miguel

(57) ABSTRACT

An embodiment for operation of an emulated electrically erasable (EEE) memory system includes a memory controller configured to identify a first quick record of a stack of quick records as a present record, wherein the stack of quick records are stored in a non-volatile portion of memory, the first quick record has a quick record status identifier (ID) that indicates the stack of quick records has not been qualified, determine a record status of a next record after the present record in the non-volatile portion of memory, and in response to a determination that the next record has a blank record status ID: update the next record from the blank record status ID to the quick record status ID, wherein the blank record status ID indicates that the next record is part of the stack of quick records, and qualify the present record using the plurality of program steps.

20 Claims, 18 Drawing Sheets

(56) References Cited

U.S. PATENT DOCUMENTS

| | | | | |
|---|---|---|---|---|
| 6,502,044 B1* | 12/2002 | Lane | ............ | H02J 7/0029 |
| | | | | 363/101 |
| 2008/0062786 A1* | 3/2008 | Kim | ............ | G11C 16/10 |
| | | | | 365/201 |
| 2010/0250875 A1* | 9/2010 | Leung | ............ | G06F 12/0246 |
| | | | | 711/155 |
| 2011/0107009 A1* | 5/2011 | Scouller | ............ | G06F 11/08 |
| | | | | 711/103 |
| 2013/0119076 A1* | 5/2013 | Johnson | ............ | B65D 25/20 |
| | | | | 220/694 |
| 2015/0127890 A1* | 5/2015 | Brainard | ............ | G06F 13/1694 |
| | | | | 711/103 |

* cited by examiner

| STATUS 605 | ADDR 610 | DATA 615 | |
|---|---|---|---|
| 0x4F (GOOD) | 0x002 | 0x5555_AAAA | ⎫ STANDARD QUALIFIED RECORDS |
| 0x3E (ERASED) | 0x005 | 0x1234_5678 | |
| 0x4F (GOOD) | 0x005 | 0xABCD_EFFF | ⎭ |
| 0x6F (QREC) | 0x004 | 0x6666_7777 | ⎫ RECORDS WRITTEN DURING QUICK WRITE MODE |
| 0x7F (BLANK) | 0x005 | 0x8888_9999 | |
| 0x7F (BLANK) | 0x002 | 0xCCCC_DDDD | |
| 0x6F (QREC) | 0x001 | 0xEEEE_FFFF | ⎭ |

| STATUS 605 | ADDR 610 | DATA 615 |
|---|---|---|
| 0x4F (GOOD) | 0x002 | 0x5555_AAAA |
| 0x3E (ERASED) | 0x005 | 0x1234_5678 |
| 0x4F (GOOD) | 0x005 | 0xABCD_EFFF |
| 0x6F (QREC) | 0x004 | 0x6666_7777 |
| 0x7F (BLANK) | 0x005 | 0x8888_9999 |
| 0x7F (BLANK) | 0x002 | 0xCCCC_DDDD |
| 0x6F (QREC) | 0x001 | 0xEEEE_FFFF |
| | | |
| | | |

Rows 620(1)–620(3): STANDARD QUALIFIED RECORDS
Rows 620(4)–620(N): RECORDS WRITTEN DURING QUICK WRITE MODE
Rows 630(1)–630(2): BLANK RECORDS

FIG. 7

| STATUS 605 | ADDR 610 | DATA 615 | |
|---|---|---|---|
| 0x4F (GOOD) | 0x002 | 0x5555_AAAA | ⎫ STANDARD QUALIFIED RECORDS |
| 0x3E (ERASED) | 0x005 | 0x1234_5678 | |
| 0x4F (GOOD) | 0x005 | 0xABCD_EFFF | |
| 0x6F (QREC) | 0x004 | 0x6666_7777 | ⎫ RECORDS WRITTEN DURING QUICK WRITE MODE |
| 0x7F (BLANK) | 0x005 | 0x8888_9999 | |
| 0x7F (BLANK) | 0x002 | 0xCCCC_DDDD | |
| 0x6F (QREC) | 0x001 | 0xEEEE_FFFF | |
| 0x4F (GOOD) | 0x099 | 0x9876_5432 | ⎫ COMPRESSION RECORD CLEANUP |
|  |  |  | |

FIG. 8

| STATUS 605 | ADDR 610 | DATA 615 | |
|---|---|---|---|
| 0x4F (GOOD) | 0x002 | 0x5555_AAAA | 620(1) — STANDARD QUALIFIED RECORDS |
| 0x3E (ERASED) | 0x005 | 0x1234_5678 | 620(2) |
| 0x4F (GOOD) | 0x005 | 0xABCD_EFFF | 620(3) |
| 0x6F (QREC) | 0x004 | 0x6666_7777 | 620(4) — RECORDS WRITTEN DURING QUICK WRITE MODE |
| 0x6F (QREC) | 0x005 | 0x8888_9999 | 620(5) |
| 0x7F (BLANK) | 0x002 | 0xCCCC_DDDD | 620(6) |
| 0x6F (QREC) | 0x001 | 0xEEEE_FFFF | 620(N) |
| 0x4F (GOOD) | 0x099 | 0x9876_5432 | 635(1) — COMPRESSION RECORD CLEANUP |
| | | | 630(2) |

| STATUS 605 | ADDR 610 | DATA 615 | |
|---|---|---|---|
| 0x4F (GOOD) | 0x002 | 0x5555_AAAA | 620(1) — ⎫ |
| 0x3E (ERASED) | 0x005 | 0x1234_5678 | 620(2) — ⎬ STANDARD QUALIFIED RECORDS |
| 0x4F (GOOD) | 0x005 | 0xABCD_EFFF | 620(3) — ⎭ |
| 0x4F (GOOD) | 0x004 | 0x6666_7777 | 620(4) — ⎫ |
| 0x6F (QREC) | 0x005 | 0x8888_9999 | 620(5) — ⎬ RECORDS WRITTEN DURING QUICK WRITE MODE |
| 0x7F (BLANK) | 0x002 | 0xCCCC_DDDD | 620(6) — |
| 0x6F (QREC) | 0x001 | 0xEEEE_FFFF | 620(N) — ⎭ |
| 0x4F (GOOD) | 0x099 | 0x9876_5432 | 635(1) — ⎫ COMPRESSION RECORD CLEANUP |
|  |  |  | 630(2) — ⎭ |

FIG. 11

| STATUS 605 | ADDR 610 | DATA 615 | |
|---|---|---|---|
| 0x4F (GOOD) | 0x002 | 0x5555_AAAA | 620(1) — STANDARD QUALIFIED RECORDS |
| 0x3E (ERASED) | 0x005 | 0x1234_5678 | 620(2) |
| 0x4E (ERASED) | 0x005 | 0xABCD_EFFF | 620(3) |
| 0x4F (GOOD) | 0x004 | 0x6666_7777 | 620(4) |
| 0x6F (QREC) | 0x005 | 0x8888_9999 | 620(5) — RECORDS WRITTEN DURING QUICK WRITE MODE |
| 0x7F (BLANK) | 0x002 | 0xCCCC_DDDD | 620(6) |
| 0x6F (QREC) | 0x001 | 0xEEEE_FFFF | 620(N) |
| 0x4F (GOOD) | 0x099 | 0x9876_5432 | 635(1) — COMPRESSION RECORD CLEANUP |
|  |  |  | 630(2) |

| STATUS 605 | ADDR 610 | DATA 615 |
|---|---|---|
| 0x4F (GOOD) | 0x002 | 0x5555_AAAA |
| 0x3E (ERASED) | 0x005 | 0x1234_5678 |
| 0x4E (ERASED) | 0x005 | 0xABCD_EFFF |
| 0x4F (GOOD) | 0x004 | 0x6666_7777 |
| 0x6F (QREC) | 0x005 | 0x8888_9999 |
| 0x7F (BLANK) | 0x002 | 0xCCCC_DDDD |
| 0x6F (QREC) | 0x001 | 0xEEEE_FFFF |
| 0x4F (GOOD) | 0x099 | 0x9876_5432 |
| 0x4F (GOOD) | 0x100 | 0xAAAA_BBBB |

- 620(1)–620(4): STANDARD QUALIFIED RECORDS
- 620(5)–620(N): RECORDS WRITTEN DURING QUICK WRITE MODE
- 635(1)–635(2): COMPRESSION RECORD CLEANUP

FIG. 12

|  | STATUS 605 | ADDR 610 | DATA 615 | |
|---|---|---|---|---|
| 620(1) | 0x4F (GOOD) | 0x002 | 0x5555_AAAA | ⎫ STANDARD QUALIFIED RECORDS |
| 620(2) | 0x3E (ERASED) | 0x005 | 0x1234_5678 | |
| 620(3) | 0x4E (ERASED) | 0x005 | 0xABCD_EFFF | |
| 620(4) | 0x4F (GOOD) | 0x004 | 0x6666_7777 | ⎭ |
| 620(5) | 0x6F (QREC) | 0x005 | 0x8888_9999 | ⎫ RECORDS WRITTEN DURING QUICK WRITE MODE |
| 620(6) | 0x6F (QREC) | 0x002 | 0xCCCC_DDDD | |
| 620(N) | 0x6F (QREC) | 0x001 | 0xEEEE_FFFF | ⎭ |
| 635(1) | 0x4F (GOOD) | 0x099 | 0x9876_5432 | ⎫ COMPRESSION RECORD CLEANUP |
| 635(2) | 0x4F (GOOD) | 0x100 | 0xAAAA_BBBB | ⎭ |

FIG. 13

| STATUS 605 | ADDR 610 | DATA 615 | |
|---|---|---|---|
| 0x4F (GOOD) | 0x002 | 0x5555_AAAA | ⎫ STANDARD QUALIFIED RECORDS |
| 0x3E (ERASED) | 0x005 | 0x1234_5678 | |
| 0x4E (ERASED) | 0x005 | 0xABCD_EFFF | |
| 0x4F (GOOD) | 0x004 | 0x6666_7777 | |
| 0x4F (GOOD) | 0x005 | 0x8888_9999 | ⎭ |
| 0x6F (QREC) | 0x002 | 0xCCCC_DDDD | ⎫ RECORDS WRITTEN DURING QUICK WRITE MODE |
| 0x6F (QREC) | 0x001 | 0xEEEE_FFFF | ⎭ |
| 0x4F (GOOD) | 0x099 | 0x9876_5432 | ⎫ COMPRESSION RECORD CLEANUP |
| 0x4F (GOOD) | 0x100 | 0xAAAA_BBBB | ⎭ |

| STATUS 605 | ADDR 610 | DATA 615 | |
|---|---|---|---|
| 0x4F (GOOD) | 0x002 | 0x5555_AAAA | 620(1) — Standard Qualified Records |
| 0x3E (ERASED) | 0x005 | 0x1234_5678 | 620(2) |
| 0x4E (ERASED) | 0x005 | 0xABCD_EFFF | 620(3) |
| 0x4F (GOOD) | 0x004 | 0x6666_7777 | 620(4) |
| 0x4F (GOOD) | 0x005 | 0x8888_9999 | 620(5) |
| 0x6F (QREC) | 0x002 | 0xCCCC_DDDD | 620(6) — Records Written During Quick Write Mode |
| 0x6F (QREC) | 0x001 | 0xEEEE_FFFF | 620(N) |
| 0x4F (GOOD) | 0x099 | 0x9876_5432 | 635(1) — Compression Record Cleanup |
| 0x4F (GOOD) | 0x100 | 0xAAAA_BBBB | 635(2) |

FIG. 15

| STATUS 605 | ADDR 610 | DATA 615 | |
|---|---|---|---|
| 0x4F (GOOD) | 0x002 | 0x5555_AAAA | 620(1) |
| 0x3E (ERASED) | 0x005 | 0x1234_5678 | 620(2) |
| 0x4E (ERASED) | 0x005 | 0xABCD_EFFF | 620(3) |
| 0x4F (GOOD) | 0x004 | 0x6666_7777 | 620(4) |
| 0x4F (GOOD) | 0x005 | 0x8888_9999 | 620(5) |
| 0x6F (QREC) | 0x002 | 0xCCCC_DDDD | 620(6) |
| 0x4F (GOOD) | 0x001 | 0xEEEE_FFFF | 620(N) |
| 0x4F (GOOD) | 0x099 | 0x9876_5432 | 635(1) |
| 0x4F (GOOD) | 0x100 | 0xAAAA_BBBB | 635(2) |

Rows 620(1)–620(3): STANDARD QUALIFIED RECORDS
Rows 620(4)–620(N): RECORDS WRITTEN DURING QUICK WRITE MODE
Rows 635(1)–635(2): COMPRESSION RECORD CLEANUP

FIG. 16

| STATUS 605 | ADDR 610 | DATA 615 | |
|---|---|---|---|
| 0x3E (ERASED) | 0x002 | 0x5555_AAAA | 620(1) — STANDARD QUALIFIED RECORDS |
| 0x3E (ERASED) | 0x005 | 0x1234_5678 | 620(2) |
| 0x4E (ERASED) | 0x005 | 0xABCD_EFFF | 620(3) |
| 0x4F (GOOD) | 0x004 | 0x6666_7777 | 620(4) |
| 0x4F (GOOD) | 0x005 | 0x8888_9999 | 620(5) |
| 0x6F (QREC) | 0x002 | 0xCCCC_DDDD | 620(6) — RECORDS WRITTEN DURING QUICK WRITE MODE |
| 0x4F (GOOD) | 0x001 | 0xEEEE_FFFF | 620(N) |
| 0x4F (GOOD) | 0x099 | 0x9876_5432 | 635(1) — COMPRESSION RECORD CLEANUP |
| 0x4F (GOOD) | 0x100 | 0xAAAA_BBBB | 635(2) |

FIG. 17

| STATUS 605 | ADDR 610 | DATA 615 | |
|---|---|---|---|
| 0x3E (ERASED) | 0x002 | 0x5555_AAAA | 620(1) |
| 0x3E (ERASED) | 0x005 | 0x1234_5678 | 620(2) |
| 0x4E (ERASED) | 0x005 | 0xABCD_EFFF | 620(3) |
| 0x4F (GOOD) | 0x004 | 0x6666_7777 | 620(4) — STANDARD QUALIFIED RECORDS |
| 0x4F (GOOD) | 0x005 | 0x8888_9999 | 620(5) |
| 0x4F (GOOD) | 0x002 | 0xCCCC_DDDD | 620(6) |
| 0x4F (GOOD) | 0x001 | 0xEEEE_FFFF | 620(N) — RECORDS WRITTEN DURING QUICK WRITE MODE |
| 0x4F (GOOD) | 0x099 | 0x9876_5432 | 635(1) — COMPRESSION RECORD CLEANUP |
| 0x4F (GOOD) | 0x100 | 0xAAAA_BBBB | 635(2) |

FIG. 18

FAST WRITE MECHANISM FOR EMULATED ELECTRICALLY ERASABLE (EEE) SYSTEM

CROSS-REFERENCE TO RELATED APPLICATIONS

This application is a continuation of U.S. patent application Ser. No. 14/829,877 having a filing date of Aug. 19, 2015, common inventors, and common assignee, which is incorporated by reference in its entirety.

BACKGROUND

Field

This disclosure relates generally to memory systems, and more specifically, to operating an emulated electrically erasable (EEE) memory system.

Related Art

Emulated electrically erasable (EEE) memory systems typically include a random access memory (RAM) and a non-volatile memory that is electrically erasable, where the non-volatile memory is much larger than the RAM. The non-volatile memory and the RAM together implement an EEE memory system that emulates an electrically erasable memory that operates as if it were only the size of the RAM. The EEE memory system has increased endurance over a regular non-volatile memory having a size comparable to that of the RAM. EEE memory systems are useful in situations in which endurance and small sector size is important, such as in automotive applications where data is updated often and must be stored in a non-volatile manner. It is important that EEE memory systems are able to cope with various failure mechanisms, such as losing power, which can be especially disastrous in an automotive environment.

BRIEF DESCRIPTION OF THE DRAWINGS

The present invention may be better understood, and its numerous objects, features, and advantages made apparent to those skilled in the art by referencing the accompanying drawings.

FIG. 6-18 illustrate block diagrams depicting an example quick write, compression, and qualification process flow of records stored in non-volatile memory of the EEE memory system, according to some embodiments.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

When a loss of power is imminent in an emulated electrically erasable (EEE) memory system, it is desirable that the EEE memory system processes as many incoming write requests as possible before complete loss of power. However, multiple program steps are conventionally required to write the data of such write requests (also referred to as EEE data) to non-volatile memory of the EEE memory system, which consumes a significant amount of time. Data loss occurs when the time to write some amount of incoming EEE data in non-volatile memory exceeds the small amount of time before power is completely lost.

The present disclosure provides for a fast write (or quick write) mechanism implemented in a memory controller, which includes quick write logic that enables the memory controller to quickly write incoming EEE data when loss of power is imminent in the EEE memory system. The memory controller is configured to receive incoming write requests for random access memory (RAM) of the EEE memory system (also referred to as emulated RAM or emulated memory) during a quick write mode and to write the EEE data of such write requests to "quick" records in non-volatile memory of the EEE memory system. The quick records are created without performing all conventional program steps, such as record qualification. This minimizes the time consumed by writing EEE data to the non-volatile memory, which also maximizes the amount of EEE data written before power is completely lost. The memory controller is also configured to perform the conventional program steps, including qualification of the quick records, at a later time, such as on the next power up of the EEE memory system when time permits. As further discussed below, the quick write mode provides a brownout tolerant manner for quickly writing EEE data to non-volatile memory.

Example Embodiments

Figure 1:
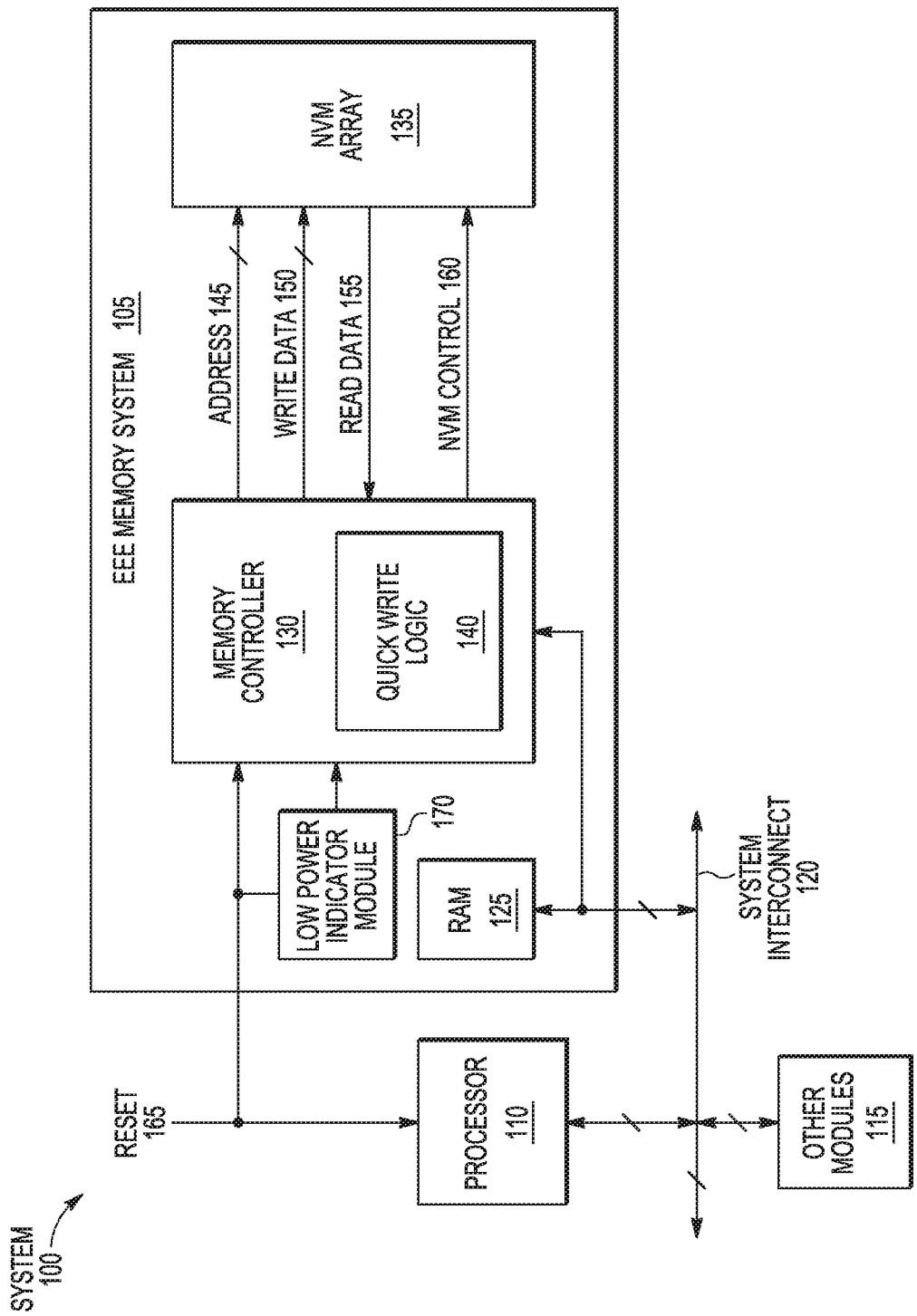
FIG. 1 illustrates a block diagram depicting an example emulated electrically erasable (EEE) memory system in which the present disclosure is implemented, according to some embodiments.

FIG. 1 illustrates a block diagram depicting a system 100 that includes an example emulated electrically erasable (EEE) memory system 105 in which the present disclosure is implemented. System 100 also includes a processor 110, other module(s) 115 (if any), a low power indicator module 170, and a system interconnect 120. Each of processor 110, other module(s) 115, and EEE memory system 105 are bidirectionally coupled to system interconnect 120. EEE memory system 105 includes random access memory (RAM) 125, a memory controller 130, quick write logic 140, and a non-volatile memory (NVM) array 135 (such as a flash array or any other type of NVM formed using a semiconductor substrate). A reset signal 165 is provided to processor 110 and memory controller 130. This reset signal may be, for example, a global reset signal for system 100.

RAM 125 (also referred to as emulated RAM), which may be considered a volatile memory, is bidirectionally coupled to system interconnect 120 and to memory controller 130. Memory controller 130 is coupled to system interconnect 120 and NVM array 135. Quick write logic 140, which is part of memory controller 130, is coupled to NVM array 135. Memory controller 130 is configured to communicate control signals 160 with NVM array 135 and to provide an address 145 and write data 150 to NVM array 135 and to receive read data 155 from NVM array 135. NVM array 135, low power indicator module 170, and quick write logic 140 are further discussed below in connection with FIG. 2.

Processor 110 can be any type of processor, such as a microprocessor, digital signal processor, and the like, or may be any other type of interconnect master that can access EEE memory system 105. In one form, system interconnect 120 is a system bus. Other forms of interconnect may be used including, for example, crossbars, point-to-point connections, and optical and wireless transmission techniques. Other modules 115 may include any type of module, such as, for example, another memory, another processor, another interconnect master, a peripheral, an input/output (I/O) device, circuitry, and the like. Alternatively, no other modules may be present in system 100.

In operation, processor 110 can send access requests, including read and write requests, to EEE memory system 105. The access requests from processor 110 include an access address and, in the case of a write request, associated write data. In the case of a read request, RAM 125 provides processor 110 the data stored at the received access address location. In the case of a write request, memory controller 110 detects receipt of the write request for RAM 125 (also referred to as a RAM update). In response, memory controller 110 locks RAM 125, selectively stores (or writes) the received access address and associated write data of the received write request to NVM array 135, updates RAM 125 to store the received write data at the received access address location, and then unlocks RAM 125. The received access address and associated write data are used to form a record that is written to a record system within NVM array 135 at the next available location of the record system. This next available location is logically sequential to a location of the last written record of the record system, which was written during an immediately preceding write operation on NVM array 135. It is noted that, referring to FIG. 1, the received access address can be provided as address 145 to NVM array 135 and the associated write data as write data 150 to NVM array 135.

In one example, the writing of the record corresponding to the RAM update is only performed (or stored in NVM array 135) if the data that is currently stored at the RAM address location is different from the new write data associated with the RAM update for that RAM address location. In this manner, NVM array 135 can store the updated data of RAM 125 in a more permanent manner. That is, when RAM 125 loses power, its data is lost. Upon restoring power, the data of the RAM 125 may be restored (e.g., read) from NVM array 135, which does not lose its data upon losing power. In one embodiment, NVM array 135 has a greater storage capacity than RAM 125. For example, NVM array 135 may have a capacity of at least four times greater than RAM 125 and typically much larger than that.

Figure 2:
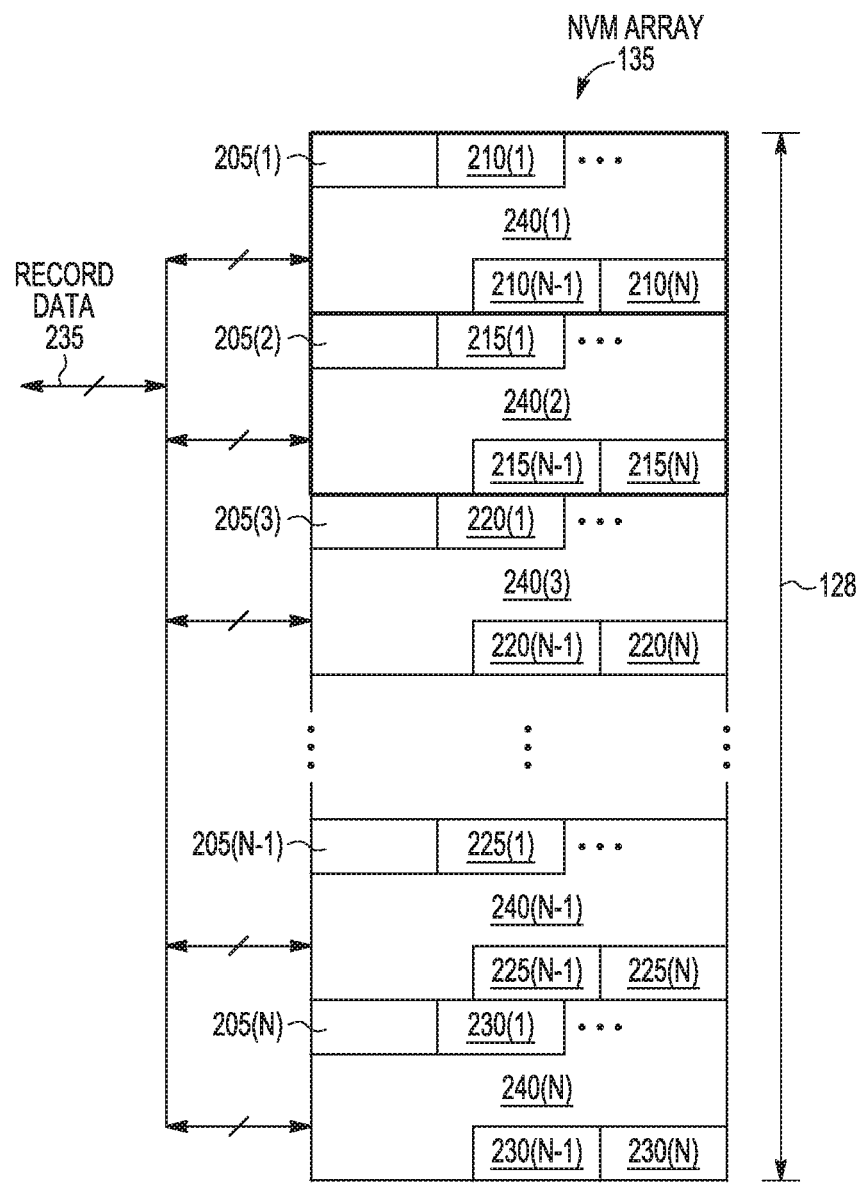
FIG. 2 illustrates a block diagram depicting an example non-volatile memory of the EEE memory system, according to some embodiments.

FIG. 2 illustrates a block diagram depicting an example non-volatile memory array 135 of the EEE memory system 105. NVM array 135 has a plurality of sectors 240(1)-(N), where each sector 240 includes at least one reserved block 205 (which is further discussed below) and a plurality of blocks. As illustrated, sector 240(1) is outlined in a box having thick black lines and includes reserved block 205(1) and a plurality of blocks 210(1)-(N). Similarly, sector 240(2) includes reserved block 205(2) and a plurality of blocks 215(1)-(N), sector 240(3) includes reserved block 205(3) and a plurality of blocks 220(1)-(N), and so on. Each block in NVM array 135 is identified by a memory address, which is a unique physical address that identifies the location of the block in NVM array 135. A sector is also identified by a memory address, such as the memory address of the first block included in the sector. In the embodiment shown, NVM array 135 has 64 sectors that each has 2 kb (kilobytes) of memory, giving NVM array 135 a size of 128 kb. Each sector is coupled to quick write logic 140 and to memory controller 130 via the connections of record data bus 235, which is illustrated as bidirectional arrows on the left side of FIG. 2.

Each block of the plurality of blocks of a sector, excluding the reserved block, is configured to store a record, where the blocks of the plurality of sectors, excluding the reserved blocks, in NVM array 135 form a record system. Each record is stored in NVM array 135 at an available location of the record system, where each available location of the record system is equivalent to an available block of NVM array 135. The memory address of a block that stores a record is also referred to as the record's record address. Memory controller 130 is configured to write records to the record system of NVM array 135 in a logically sequential manner at subsequent locations within the record system of NVM array 135, where each subsequent location is identified by an incremented record address. In other words, memory controller 130 successively writes records to a next available location or block of a sector, such as by successively writing records to block 210(1) of sector 240(1), then to block 210(2), and so on through block 210(N). The next available location is a location that immediately follows the location of the last written record of the record system. The sector that includes the next available location is also referred to as a newest sector, where sectors that precede the newest sector are referred to as older sectors.

Once a given sector is full (e.g., records have been written to all blocks in the sector), memory controller 130 successively writes records to a next available location within a subsequent sector, such as to block 215(1) of next sector 240(2). Memory controller 130 continues writing records to the record system of NVM array 135 in a structured manner, such as a "round robin" manner or a cyclical manner, through the record system locations in NVM array 135 (e.g., once the end of NVM array 135 is reached, memory controller 130 begins writing at the top of NVM array 135).

Memory controller 130 is also configured to identify the next available location (or next available record address) to which a next record can be written by utilizing a program pointer that indicates or points to the next available location. The program pointer is also used to track the location of the last written record (or last written record address), which is the location immediately preceding the program pointer. Memory controller 130 is also configured to read records from NVM array 135 located at one or more record addresses. Record data bus 235 is configured to communicate record data as write data 150 and read data 155 between memory controller 130 and NVM array 135, as needed.

The reserved block 205 of each sector is a reserved section of memory that stores information about the respective sector, such as a sector identifier (ID) for the respective sector. A sector ID implements a unique coding algorithm, where the sector ID includes a number of bits that indicate a present erase lifecycle stage (also referred to as an erase status) of the respective sector, such as whether the sector is successfully erased or is ready for records to be added. The sector ID is progressed through the erase lifecycle by multiple program steps performed by the memory controller 130. Example sector IDs are illustrated in Table 1 below.

TABLE 1

(Sector Status)

| Lifecycle Stage | Value | Description |
| --- | --- | --- |
| ERASED | 0xFFFF | Erased sector |
| READY | 0xFFEE | First step qualifying erase |
| READYQ | 0xEEEE | Qualified erase sector |
| FULL | 0xEECC | First step prior to adding records |
| FULLQ | 0xCCCC | Qualified to add records |
| FULLE | 0xCC44 | Previous sector ready to be erased |
| FULLEQ | 0x4444 | Previous sector qualified to be erased |
| FULLC | 0x4400 | Previous sector ready for compress |
| FULLCQ | 0x0000 | Previous sector qualified for compress |

Each record in NVM array 135 stores a received access address (or an address located in RAM 125, also referred to as a RAM address), associated write data (or the data stored at the address located in RAM 125), and a record status identifier (ID) that indicates the status of the record in NVM array 135. Record status IDs indicate whether a given record stores valid data (which is a valid record) or stores invalid data (which is an invalid record). Record status IDs may be qualified record status IDs (such as GOOD status and ERASED status) that indicate qualification has been performed on the record, as further discussed below. Record status IDs may also be non-qualified record status IDs (such as BLANK status) that indicate qualification has not been performed on the record. Example record status IDs are provided in Table 2 below.

TABLE 2

(Record Status)

| Record Status | Value | Description |
| --- | --- | --- |
| BLANK | 0x7F | Empty record ready (non-qualified status) |
| GOOD | 0x4F | Valid record (qualified status) |
| ERASED | 0x3E | Invalid record (qualified status) |
| ERASEDC | 0x4E | Valid record erased during compression |

When record data is written to a given block as a new record, memory controller 130 is conventionally required to perform compression operations to consolidate records in NVM array 135. For example, if the associated write data of the new record replaces data currently stored at the RAM address, memory controller 130 performs compression by erasing any older records in NVM array 135 that are associated with the RAM address of the new record, which requires multiple program steps. Also, memory controller 130 periodically performs compression on the record system to move older valid records from older sectors to newer sectors in order to free up the older sectors to be erased, as well as performing erasure of the older sectors, which requires multiple program steps (also referred to as erase overhead). It is noted that memory controller 130 is conventionally constrained to only perform compression on valid qualified records in NVM array 135 (e.g., having GOOD record status ID). For example, memory controller 130 conventionally skips records having ERASED status or BLANK status during compression, since such records would not contain any valid data (or at least any data contained in the record would be invalid). Similarly, memory controller 130 is conventionally constrained to only perform a copy down transfer operation to restore data from NVM array 135 to RAM 125 on valid qualified records in NVM array 135.

Additionally, whether the write data is new to RAM 125 or replaces data previously stored in RAM 125, memory controller 130 is also conventionally required to perform qualification of the resulting record to verify whether the record data has been successfully written to the given block, and to update the record status of the resulting record accordingly. Qualification is implemented using multiple program steps in order to preserve the record status in case of system failure (e.g., loss of power) that may occur while determining the record status. In other words, conventionally updating the record status also requires multiple program steps. If the record data passes qualification, memory controller 130 updates the record status with a qualified record status ID to indicate the record is valid, such as GOOD. If the record data fails qualification (e.g., the given block stores invalid data), memory controller 130 also updates the record status with a qualified record status ID to indicate the record is invalid, such as ERASED. For records that fail qualification, memory controller 130 re-attempts writing the record data to a subsequent block and performs qualification of the new resulting record. Memory controller 130 continues doing so until the record data passes qualification, and then moves on to the next access request.

Even when a loss of power is imminent, memory controller 130 continues to receive write requests (which may be stored in a queue or buffer of EEE memory system 105 as they are received) and continues to store the associated write data in records in NVM array 135. However, the multiple program steps of compression, qualification, and erase overhead that are performed when creating such records consume a significant amount of time. For example, a worst case scenario for record creation may consume on the order of 1 ms, due to performing standard compression, qualification, and erase overhead program steps as part of record creation. This may cause data loss due to memory controller 130 being unable to successfully write all received write requests for RAM 125 to NVM array 135 within the finite amount of time between when low power is detected and when power is completely lost.

The present disclosure provides for quick write logic 140, which is included in memory controller 130, configured to implement a quick write mode for quickly writing EEE data to the NVM array 135 in the form of quick write records, or simply quick records. Quick write logic 140 is configured to trigger the quick write mode in response to detecting that loss of power to EEE memory system 105 is imminent, such as by utilizing a low power indicator module 170. Low power indicator module 170 includes circuitry configured to monitor power levels of system 100, and may accordingly be coupled to a power supply of system 100 and to reset signal 165. When power levels fall below some defined power threshold or when the reset signal 165 is active, the low power indicator module 170 triggers (or outputs) a low power indicator to signal quick write logic 140 that loss of power is imminent. Low power indicator module 170 may also include a capacitor (e.g., previously charged by the power supply) that will maintain power to EEE memory system 105 for a known or predetermined amount of time during which quick records are written to NVM array 135. In some embodiments, memory controller 130 activates a quick write mode indicator when quick write mode is entered, which is later cleared once quick write mode is complete or released. If power loss occurs before the quick write mode indicator is cleared, the active quick write mode indicator provides an indication to memory controller 130 on subsequent startup that a quick write was attempted and not completed. Memory controller 130 may then clear the quick write mode indicator on startup. Quick write mode may also be referred to as a low power mode, while normal operation (e.g., on start up) may also be referred to as a full power mode.

During quick write mode, memory controller 130 is enabled to write EEE data of incoming write requests for RAM 125 as a stack (e.g., sequential set) of two or more quick records in NVM array 135, without performing standard compression, qualification, and erase overhead program steps as part of quick record creation. By eliminating such program steps from quick record creation, the time consumed by quick record creation is minimized, which also maximizes the number of quick records written before power is completely lost. For example, the time needed to create a new quick record during quick write mode is on the order of 0.1 ms. Each record created during quick write mode includes the access address and associated write data of a respective incoming write request. Each record created during quick write mode is not qualified. Each record created during quick write mode is also given a record status of BLANK.

A verification step is also performed as part of quick record creation to determine whether the record data (which includes the access address and associated write data of a received write request) of the quick record is successfully written to NVM array 135. A record that fails the verification step is given INVALID status, and the memory controller 130 re-attempts writing the record data in subsequent new records until the record data is successfully written. Since the records created during quick write mode are not qualified, INVALID status is a non-qualified record status ID that indicates the record is invalid.

Quick write logic 140 also implements a new record status ID, quick record status or QREC status (e.g., 0x6F), that is utilized to identify a first quick record and a last quick record of the stack of quick records, where the first and last quick records have each passed the verification step. As such, QREC is a non-qualified record status ID that indicates the quick record is valid. Any quick records between the first and last quick records that have each passed the verification step are referred to as intermediate quick records and each have a record status ID of BLANK. In other words, memory controller 130 only updates the record statuses of the first and last quick records to QREC, and does not update the record statuses of any intermediate quick records, which further reduces quick record creation time. As such, BLANK serves as a non-qualified record status ID that identifies valid quick records located between the first and last quick records. An updated listing of example record status IDs is provided in Table 3 below.

TABLE 3

(Updated Record Status)

| Record Status | Value | Description |
| --- | --- | --- |
| QREC | 0x6F | First/last quick record (non-qualified status) |
| INVALID | 0x3F | Invalid quick record (non-qualified status) |
| BLANK | 0x7F | Empty record ready, or intermediate quick record if between pair of QREC quick records (non-qualified status) |
| GOOD | 0x4F | Valid record (qualified status) |
| ERASED | 0x3E | Invalid record (qualified status) |
| ERASEDC | 0x4E | Valid record erased during compression |

Quick write logic 140 also includes a mode expiration timer that is initialized with the predetermined amount of time during which power is maintained to EEE memory system 105 (also referred to as mode time) when low power indicator is activated, and releases quick write mode upon expiration of the timer. The mode expiration timer is used to estimate a number of write requests that can be processed by memory controller 130 before power loss. For example, memory controller 130 can estimate that an N number of write requests can be processed before expiration of the mode time (i.e., before power loss), where the address and data of each of the N write requests is added as a quick record to NVM array 135. However, if one or more of the quick records fail the verification step, memory controller 130 spends some of the remaining mode time re-writing the record data to a next quick record, which reduces the total number of write requests that are processed (and resulting quick records) during the mode time.

Quick write logic 140 is also configured to enable memory controller 130 to access records having record status of QREC and BLANK during compression, qualification, and copy down operations. This enables memory controller 130 to perform a copy down operation that includes restoring the quick records to RAM 125 (e.g., upon subsequent startup of system 100). This also enables memory controller 130 to perform compression and qualification of the quick records at a later time (e.g., after subsequent startup of system 100) when time permits. Quick write mode is discussed below in connection with FIG. 3. An example compression and qualification process is discussed below in connection with FIG. 4. An example copy down process is discussed below in connection with FIG. 5.

Figure 3:
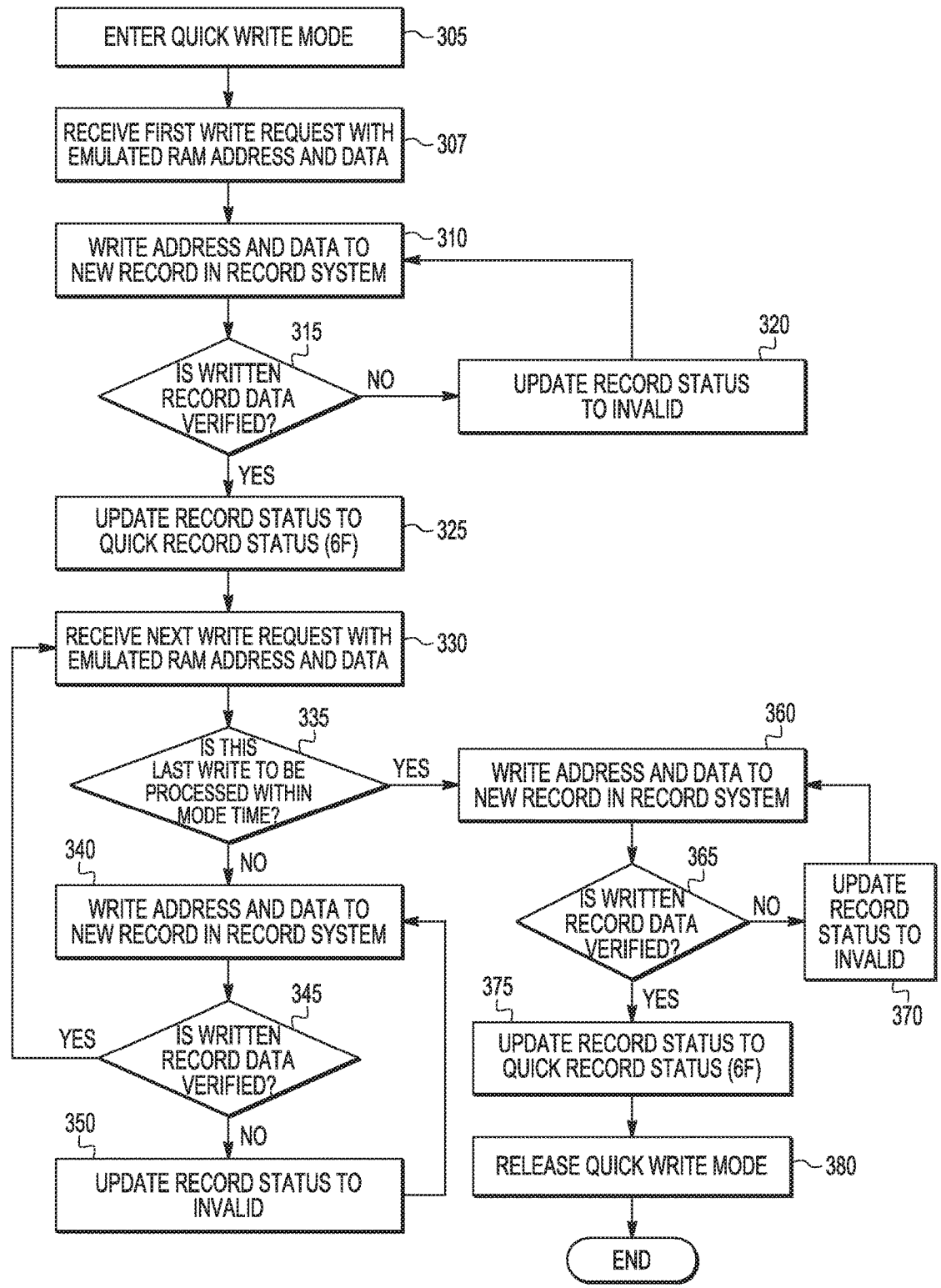
FIG. 3 illustrates a flowchart depicting an example quick write process implemented by a memory controller that includes quick write logic in which the disclosure is implemented, according to some embodiments.

FIG. 3 illustrates a flowchart depicting an example quick write process implemented by memory controller 130 that includes quick write logic 140. It is noted that for the discussion of the flowcharts herein, a "present" object is relative to the process operation being discussed, unless otherwise noted. For example, one operation may go to a "next" record or address, where that "next" record or address becomes the "present" record or address for a subsequent operation.

The process begins at operation 305, where quick write logic 140 triggers memory controller 130 to enter quick write mode, which is triggered by quick write logic 140 in response to detecting that loss of power is imminent. The process continues to operation 307, where memory controller 130 receives a write request for RAM 125 from processor 110, where the write request includes an address in RAM 125 (also referred to as an emulated RAM address) and associated data to be written at the emulated RAM address. It is noted that the write request received immediately after entering quick write mode is also referred to as an initial or first write request.

The process continues to operation 310, where memory controller 130 creates a new record associated with the initial write request in NVM array 135. To create the new record, memory controller 130 writes the emulated RAM address of the initial write request, the associated data of the initial write request, and a BLANK record status ID as record data of the new record at a next available location in the record system of NVM array 135 (e.g., to a blank record location logically subsequent to the last written record of the record system). The new record is written to (or created in) NVM array 135 in one program (or write) step. The process continues to operation 315, where memory controller 130 verifies whether the record data written to the new record is successfully written, such as by performing a verification operation (e.g., determining whether the record data written in NVM array matches the associated data of the initial write request). If the written record data fails verification, the process continues to operation 320, where memory controller 130 updates the record status of the new record to INVALID. Updating the record status includes writing the record status ID of INVALID to the new record, replacing the BLANK record status ID. The process then returns to operation 310, where memory controller 130 performs another attempt to write the record data to another new record at the next available location in the record system (which is logically sequential to the invalidated record of operation 320).

Returning to operation 315, if the written record data passes verification, the process continues to operation 325, where memory controller 130 updates the record status of the present record to quick record (QREC) status. The records that are successfully written to the record system of NVM array 135 during quick write mode are also referred to as quick write records, or quick records. It is noted that the present quick record of operation 325 is associated with the initial write request, and accordingly is a first or initial quick record having QREC status (also referred to as a first QREC record). Updating the record status includes writing the record status ID of QREC to the first quick record, replacing the BLANK record status ID.

The process continues to operation 330, where memory controller 130 receives a next write request that includes an emulated RAM address and associated data to be written to the emulated RAM address. It is noted that the next write request is received from processor 110 after the initial write request and may be stored in a queue or buffer until memory controller 130 is ready to process the next write request. The process continues to operation 335, where memory controller 130 checks whether the received write request is the last or final write request that can be processed by memory controller 130 within the remaining amount of mode time. In some embodiments, memory controller 130 compares an estimated process time for creating a quick record with the remaining amount of mode time, as indicated by the mode expiration timer.

If the received write request is not the last write request to be processed (e.g., the remaining amount of mode time is great enough to process two or more write requests), the process continues to operation 340, where memory controller 130 creates a new record associated with the received write request in the record system. Memory controller 130 writes the address of the received write request, the associated data of the received write request, and a BLANK record status ID as record data of the new record at the next available location in the record system. The process continues to operation 345, where memory controller 130 verifies whether the written record data in the new record is successfully written. If the written record data fails verification, the process continues to operation 350, where memory controller 130 updates the record status of the new record to INVALID, replacing the BLANK record status ID. The process then returns to operation 340, where memory controller 130 performs another attempt to write the record data to another new record at the next available location in the record system (which is logically sequential to the invalidated record of operation 350).

Returning to operation 345, if the written record data passes verification, then the verified new record is referred to as an intermediate quick record, which is associated with a write request that is not the initial write request and not the last write request (which in turn is referred to as an intermediate or subsequent write request). It is also noted that memory controller 130 does not update the record status of the intermediate quick record (e.g., status of the intermediate quick record remains BLANK). The process returns to operation 330, where memory controller 130 receives the next write request for processing.

Returning to operation 335, if the received write request is the last write request to be processed (e.g., the remaining amount of mode time is not great enough to process two or more write requests), the process continues to operation 360, where memory controller 130 creates a new record associated with the last write request in the record system. Memory controller 130 writes the address of the last write request, the associated data of the last write request, and a BLANK record status ID as record data of the new record at the next available location in the record system. The process continues to operation 365, where memory controller 130 verifies whether the written record data in the new record is successfully written. If the written record data fails verification, the process continues to operation 370, where memory controller 130 updates the record status of the new record to INVALID, replacing the BLANK record status ID. The process then returns to operation 360, where memory controller 130 performs another attempt to write the record data to another new record at the next available location in the record system (which is logically sequential to the invalidated record of operation 370).

Returning to operation 365, if the written record data passes verification, the process continues to operation 375, where memory controller 130 updates the record status of the present record to quick record (QREC) status. Since the present quick record of operation 375 is associated with the last write request, the present quick record is a last or final quick record having QREC status (also referred to as a final QREC record). Updating the record status includes writing the record status ID of QREC to the last quick record, replacing the BLANK record status ID. In some embodiments, the last quick record is written in two program (or write) steps, to ensure the record data of the last quick record is written well (e.g., to ensure the record data is successfully written to NVM array 135). The process continues to operation 380, where quick write logic 140 releases quick write mode, allowing memory controller 130 to perform standard operations. The process then ends.

Figure 4:
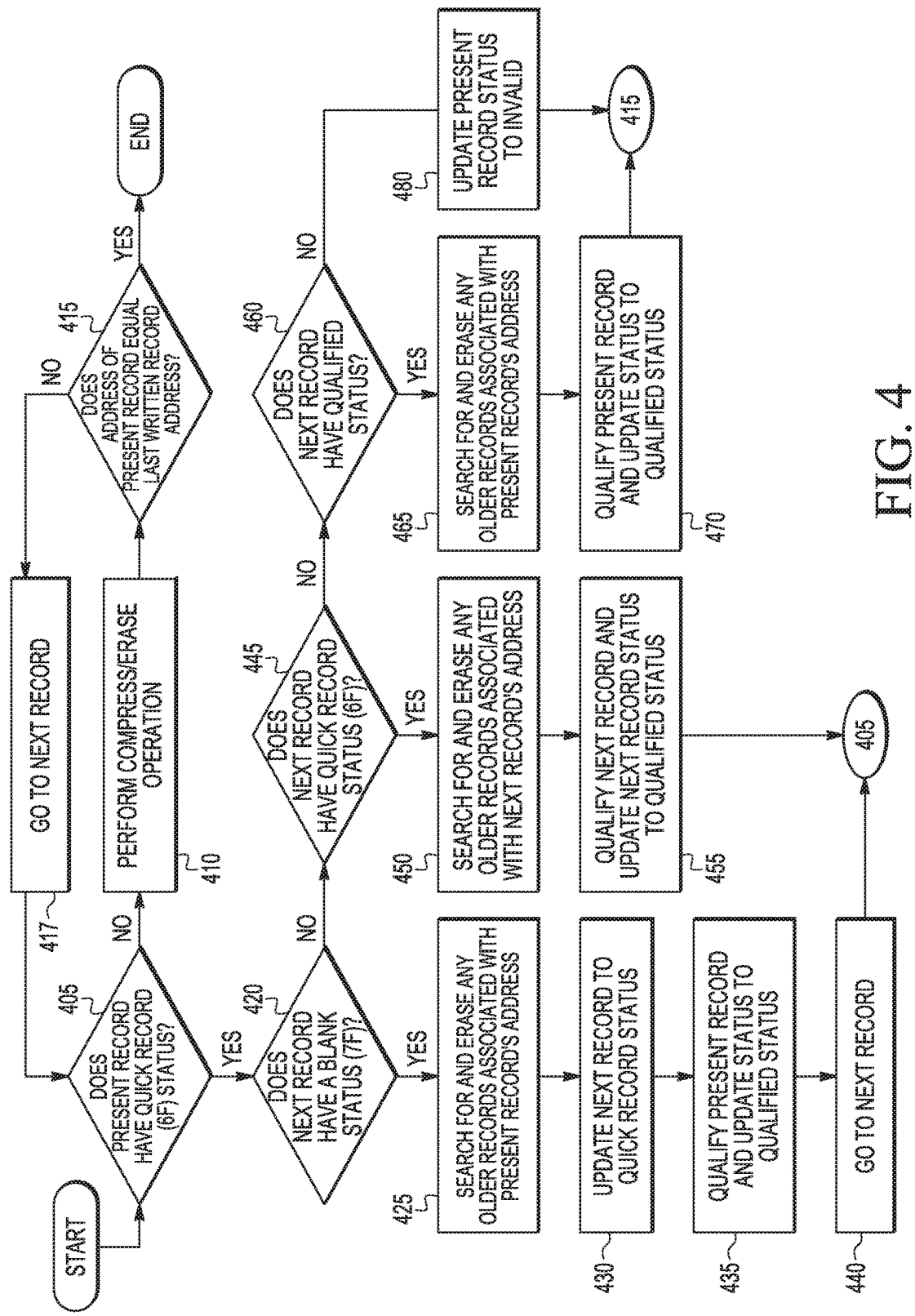
FIG. 4 illustrates a flowchart depicting an example compression and qualification process implemented by a memory controller that includes quick write logic in which the disclosure is implemented, according to some embodiments.

FIG. 4 illustrates a flowchart depicting an example compression and qualification process implemented by memory controller 130 that includes quick write logic 140. The process of FIG. 4 can be triggered at a time after a stack of quick records have been written to the record system of NVM array 135 (e.g., after system 100 restarts subsequent to the power loss that caused the stack of quick records to be written to NVM array 135). The process of FIG. 4 can also be triggered during standard operation of memory controller 130. For example, memory controller 130 may trigger the compression and qualification process of FIG. 4 as part of writing RAM updates to NVM array 135 during standard operation of system 100. Once the process of FIG. 4 is triggered, memory controller 130 is initialized to begin at some starting record in the record system of NVM array 135 (e.g., an oldest valid record).

The process begins at operation 405, where memory controller 130 determines whether a present record has quick record (QREC) status. If the present record does not have QREC status, the process continues to operation 410, where memory controller 130 performs standard compression for the present record, also referred to as a compress and erase operation. The compress and erase operation includes identifying whether the present record is an older valid record located in an older sector (e.g., a sector that needs to be erased) of the record system and writing the record data of the older valid record to the next available location in the newest sector. The older valid record in the older sector is then erased. Standard compression is further discussed below in connection with FIG. 6-18.

The process continues to operation 415, where memory controller 130 checks whether the record address of the present record is equal to the last written record address of the record system. If so, memory controller 130 has iterated through all records in the record system and the process ends. If the record address of the present record is not equal to the last written record address, the process continues to operation 417, where memory controller 130 goes to a next record in the record system, iterating through the record system from the oldest record to the newest record (or the last written record). The process then returns to operation 405. Accordingly, operations 405, 410, 415, and 417 implement a standard compression process on the record system, even when no quick records are present in the record system.

Returning to operation 405, if the present record has QREC status, the process continues to operation 420, where memory controller 130 determines whether the next record has BLANK status. It is noted that the record determined to have QREC status in operation 405 is a first QREC record and is referred to as the "present record" in the subsequently-discussed operations of FIG. 4 (e.g., operations 425, 435, 465, 470, and 480). It is also noted that the next logically sequential record after the present record is referred to as the "next record" in the subsequently-discussed operations of FIG. 4 (e.g., operations 420, 430, 440, 445, 450, 455, and 460). Accordingly, the subsequently-discussed operations of FIG. 4 implement a compression and qualification process for quick records. It is also noted that a valid stack of quick records is expected to include at least a first QREC record and a last QREC record. Any intermediate quick records between the first and last QREC records are expected to have BLANK status.

It is noted that FIG. 4 illustrates a single unified embodiment of compression and qualification process, where memory controller 130 iterates from the oldest record in the record system to the new record in the record system (also referred to as the last written record). In other embodiments, the standard compression process implemented by operations 405-417 and the quick record compression and qualification process implemented by operations 420-480 may be implemented in a distributed manner. For example, memory controller 130 may perform a single cycle of the standard compression process beginning with the oldest record in record system. Instead of immediately performing a subsequent cycle of the standard compression process for the next-to-oldest record, memory controller 130 may switch to the quick record compression and qualification process. In such an embodiment, memory controller 130 may perform a single cycle of the compression and qualification process beginning with the first QREC record in record system. Instead of immediately performing a subsequent cycle of the compression and qualification process, memory controller 130 may switch back to the standard compression process, and so on. Such an embodiment is discussed below in connection with FIG. 6-18.

Returning to operation 420, if the next record has BLANK status (and is accordingly an intermediate quick record), the process continues to operation 425, where memory controller 130 performs compression for the present quick record by searching for and erasing any older records associated with the RAM address stored in the present record (or the first QREC record). The process continues to operation 430, where memory controller 130 updates the next record (or the intermediate quick record) to have QREC status. In other words, the intermediate quick record becomes the "new" first QREC record. This ensures that the stack of quick records in the record system remains valid once the status of the "old" first QREC record is updated. The process continues to operation 435, where memory controller 130 performs qualification of the present record (or the "old" first QREC record) and updates the record status of the present record with a qualified record status ID, based on the results of the qualification. For example, if the present record is successfully qualified, the record status is updated to GOOD status. If the present record is not successfully qualified, the record status is updated to ERASED status. The process continues to operation 440, where memory controller 130 goes to the next record (or the "new" first QREC record of operation 430). The process then returns to operation 405, where the "new" first QREC record is referred to as the present record (or first QREC record).

Returning to operation 420, if the next record does not have BLANK status, the process continues to operation 445, where memory controller 130 determines whether the next record (or the record after the first QREC record) has QREC status. If so, the next record is determined to be the last QREC record, without any intermediate quick records. The process continues to operation 450, where memory controller 130 searches for and erases any older records associated with the RAM address stored in the next record (or the last QREC record). The process continues to operation 455, where memory controller 130 qualifies the next record (or last QREC record) and updates the record status of the next record with a qualified record status ID, based on the results of the qualification. In other words, the last QREC record is qualified before the first QREC record.

As noted above, a valid stack of quick records is expected to include a pair of QREC records. As the stack of quick records is qualified, the last quick record in the stack will invariably become a single QREC record. However, a single QREC record may also result from a failed quick write (e.g., memory controller 130 began to write the stack of quick records to NVM array 135, but lost power before the final QREC record could be written). To distinguish a valid single QREC record of a successful quick write from an invalid single QREC record of a failed quick write, the last QREC record is qualified before the first QREC record in order to ensure that a qualified record immediately follows the first QREC record. Memory controller 130 considers a first (or single) QREC record paired with a following qualified record as part of a valid stack of quick records. After qualification of the last QREC record in operation 455, the process returns to operation 405, where the present record continues to be the same first QREC record. In other words, memory controller 130 does not go to the next record (as it does in operation 440).

Returning to operation 445, if the next record does not have QREC status, the process continues to operation 460, where memory controller 130 determines whether the next record has a qualified record status ID (such as GOOD and ERASED). If so, the present record (or first QREC record) is determined to be part of a valid stack, and the process continues to operation 465, where memory controller 130 searches for and erases any older records associated with the RAM address stored in the present record. The process continues to operation 470, where memory controller 130 qualifies the present record and updates the record status of the present record with a qualified record status ID, based on the results of the qualification. Once the present record is qualified, qualification of the entire stack of quick records is complete. The process continues to operation 415, where memory controller 130 determines whether iteration through the records in the record system is complete. If not, memory controller continues compression for any remaining records in the record system (e.g., performs operations 405-417). Otherwise, memory controller 130 has iterated through all records in the record system and the process ends.

Returning to operation 460, if the next record does not have a qualified record status ID (e.g., has BLANK or INVALID status), the present record (or first QREC record) is a single QREC record that is not considered part of a valid stack, and the process continues to operation 480, where memory controller 130 updates the present record status to INVALID. The process continues to operation 415 to determine if iteration through the records in the record system is complete, as described above.

Figure 5:
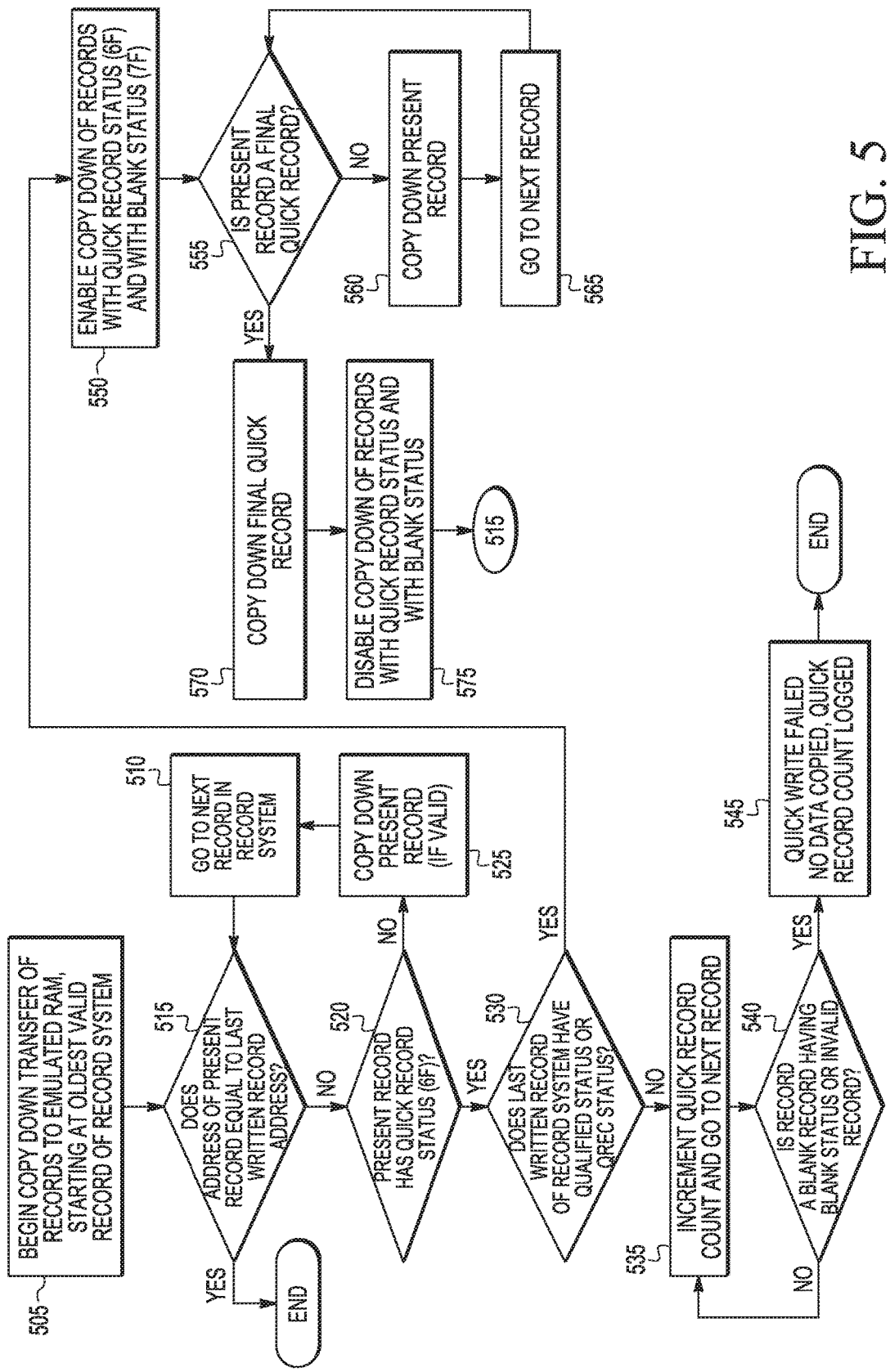
FIG. 5 illustrates a flowchart depicting an example copy down process implemented by a memory controller that includes quick write logic in which the disclosure is implemented, according to some embodiments.

FIG. 5 illustrates a flowchart depicting an example copy down process implemented by memory controller 130 that includes quick write logic 140. A copy down process can be triggered in response to startup of system 100 (e.g., after reset, shut down, or power loss in system 100). The copy down process begins at operation 505, where memory controller 130 begins a copy down transfer of records in the record system of NVM array 135 to RAM 125, starting at an oldest valid record of the record system. The process continues to operation 515, where memory controller 130 determines whether the record address of the present address is equal to the last written record address of the record system. If so, memory controller 130 has iterated through all records in the record system and the process ends.

Returning to operation 515, if the record address of the present record is not equal to the last written record address, the process continues to operation 520, where memory controller 130 determines whether the present record has quick record (QREC) status. If the present record does not have QREC status, the process continues to operation 525, where memory controller 130 copies down the present record to RAM 125, if the present record is a valid qualified record (e.g., the present record includes GOOD status). As used herein, memory controller 130 "copies down" a present record to RAM 125 by writing the data stored in the present record to RAM 125 at the associated RAM address stored in the present record. The process continues to operation 510, where memory controller 130 goes to the next record in the record system by incrementing the present record address. The process then returns to operation 515.

Returning to operation 520, if the present record has QREC status, the present record is a first QREC record and the process continues to operation 530, where memory controller 130 determines whether the last written record of the record system has either a qualified record status ID (such as GOOD and ERASED) or QREC status ID. If the last written record does not have a qualified record status ID and does not have a QREC status (e.g., the last written record instead has BLANK status or INVALID status), then the quick write failed, indicating that the entire stack of quick records (which includes any quick records located after the first QREC record) is invalid. Memory controller 130 then initializes a quick record count to zero.

The process continues to operation 535, where memory controller 130 increments the quick record count to count the number of quick records included in the stack of quick records. Memory controller 130 then goes to the next record. The process continues to operation 540, where memory controller 130 determines whether the present record is a blank record having BLANK status or a record having INVALID status. Since any intermediate quick records following the first QREC record still have BLANK status, memory controller 130 must check whether there is any data stored in the present record to distinguish intermediate quick records having BLANK status from blank new records. If there is data stored in the present record having BLANK status (e.g., RAM address and associated data), the present record is not a blank record, and the process returns to operation 535, where memory controller increments the quick write count. If there is no data stored in the present record having BLANK status or if the present record has INVALID status, the entire stack of quick records has been counted and the process continues to operation 545, where memory controller 130 logs the quick record count in RAM 125, indicating quick write failed. No record data is copied to RAM 125. The process then ends.

Returning to operation 530, if the status of the last written record of the record system includes a qualified record status ID or QREC status ID, the quick write succeeded and the stack of quick records is valid. As such, the process continues to operation 550, quick write logic 140 enables memory controller 130 to perform copy down of records that have quick record (QREC) and BLANK record status IDs. The process continues to operation 555, where memory controller 130 determines whether the present record is a final QREC record. For the copy down process, the present record is determined to be a final QREC record (e.g., last QREC record) if it is followed by a record having BLANK status that does not store any data (e.g., a blank new record), or followed by a record having a qualified record status ID. By contrast, a first QREC record is followed by an intermediate quick record having BLANK status that stores data, or followed by another QREC record (e.g., the last QREC record).

If the present record is not a final QREC record, the process continues to operation 560, where memory controller copies down the present record to RAM 125. The process continues to operation 565, where memory controller 130 goes to the next record. The process then returns to operation 555. In other words, memory controller 130 copies down the first QREC record and any following quick records with BLANK status until the final QREC record.

Returning to operation 555, if the present record is determined to be a final QREC record, the process continues to operation 570, where memory controller 130 copies down the final QREC record. The process continues to operation 575, where quick write logic 140 disables memory controller 130 to copy down records having QREC status and BLANK status. The process returns to operation 515, where memory controller 130 determines whether iteration through the records in the record system is complete. If not, memory controller continues the copy down transfer to RAM 125. Otherwise, memory controller 130 has iterated through all records in the record system and the process ends.

FIG. 6-18 illustrate block diagrams depicting an example quick write, compression, and qualification process flow of records stored in NVM array 135 of the EEE memory system 105 by memory controller 130. FIG. 6 illustrates a portion of the record system in a newest sector of NVM array 135 after a successful quick write. Each record 620 includes record status 605, RAM address 610, and associated RAM data 615. Records 620(1)-620(3) are standard qualified records stored in the record system at some time prior to the successful quick write. Records 620(4)-620(N) are a stack of quick records, or records written during quick write mode. Record 620(4) is a first QREC record (as indicated by QREC status) and 620(N) is a last QREC record. Records 620(5) and 620(6) are intermediate quick records between the first and last QREC records (as also indicated by BLANK status). Record 620(N) is the last written record of the record system.

FIG. 7 illustrates the portion of the record system upon start of a compression and qualification process, like that illustrated in FIG. 4. Blank records 630(1) and 620(2) are also illustrated after the last written record 620(N). A program pointer (not shown) points to the next available location after the last written record, which is presently blank record 630(1).

FIG. 8 illustrates the portion of the record system after standard compression has been performed for an older record not included in the illustrated portion of the record system (e.g., is a record located further "above" record 620(1) in an older sector of NVM array 135). The older record has been written to the next available location as part of compression record cleanup, which is illustrated as record 635(1). The record data of the older record was rewritten to record 635(1) and the older record was then erased from an older sector in NVM array 135. Record 635(1) is also a qualified record and is the last written record. Blank record 630(2) becomes the next available location.

Memory controller then switches processes and finds record 620(4) as the first QREC record (as indicated by the circle around record 620(4)'s record status) of a stack of QREC records. Memory controller begins a compression and qualification process for record 620(4). Memory controller verifies that the next record, record 620(5), does indeed have BLANK status, and in response, performs compression for record 620(5) by searching for and erasing any older records associated with present record 620(4)'s RAM address (or 0x004 as illustrated).

In FIG. 9, memory controller updates the record status of the next record, record 620(5), to QREC status. In FIG. 10, memory controller qualifies the present record, record 620(4), and updates the record status of record 620(4) to a qualified status (such as GOOD status), as indicated by the circle around the record status of record 620(4).

Memory controller may switch back and forth between the standard compression process and the quick record compression and qualification process, and not necessarily after an entire cycle of either process has been completed. For example, memory controller may switch between the processes after a number of steps within the process has completed. For example, in the embodiment illustrated in FIG. 11, memory controller does not immediately return to the standard compression process, but instead goes to the next record, record 620(5), to begin the quick record compression and qualification process.

In FIG. 11, memory controller identifies the present record, record 620(5), as having QREC status and verifies that the next record, record 620(6), has BLANK status. In response, memory controller searches for and erases any older records associated with present record 620(5)'s RAM address, or 0x005, as indicated by the circle around RAM address of record 620(5). Memory controller finds that record 620(3) also stores RAM address 0x005. Memory controller then erases record 620(3) in favor of record 620(5). In some embodiments, memory controller updates record status of record 620(3) to ERASEDC status (illustrated as 0x4E) that identifies record 620(3) as a candidate for erasure at some later time. Once all records in a sector have ERASED or ERASEDC status, memory controller performs erasure of the records in the sector, in order to minimize any disturb on the surrounding valid records.

In FIG. 12, memory controller switches to the standard compression process for another older record not included in the illustrated portion of the record system. The older record has been written to the next available location as part of compression record cleanup, which is illustrated as record 635(2). The record data of the older record was rewritten to record 635(2) and the older record was then erased from the older sector in NVM array 135. Record 635(2) is also a qualified record and is the last written record. The blank record after record 635(2) becomes the next available location. The memory controller then switches back to the quick record compression and qualification process for present record 620(5), as indicated by the circle around record 620(5)'s record status. The memory controller verifies that the next record, record 620(6), has BLANK status. In response, memory controller searches for and erases any older records associated with present record 620(5)'s RAM address.

In FIG. 13, the memory controller updates the record status of the next record, record 620(6), to QREC status. In FIG. 14, memory controller qualifies the present record 620(5) and updates the record status of record 620(5) to a qualified status, as indicated by the circle around the record status of record 620(5). It is noted that the stack of quick records now includes two remaining and neighboring records, record 620(6) as the first QREC record and record 620(N) as the last QREC record. Memory controller may switch back to the standard compression process at this time, but for ease of understanding, the remaining FIG. 15-18 finish describing the compression and qualification process for the remaining QREC records.

In FIG. 15, the present record is record 620(6), which has QREC status. The memory controller verifies that the next record, record 620(N), also has QREC status. The memory controller then searches for and erases any older records associated with the next record 620(N)'s RAM address. In FIG. 16, memory controller qualifies next record 620(N) and updates the record status of the next record 620(N) to a qualified status, as indicated by the circle around the record status of record 620(N).

In FIG. 17, the present record is still 620(6). The memory controller verifies that the next record, record 620(N), has a qualified status (illustrated as GOOD status). The memory controller then searches for and erases any older records associated with present record 620(6)'s RAM address, such as record 620(1).

In FIG. 18, the memory controller then qualifies the present record 620(6) and updates record 620(6)'s record status to a qualified status, as indicated by the circle around the record status of record 620(6). The compression and qualification of the stack of quick records is complete.

By now it should be appreciated that there has been provided a quick write scheme that enables the memory controller to quickly write incoming EEE data when loss of power is imminent in the EEE memory system. In one embodiment of the present disclosure, a processing system is provided, which includes a processor; an emulated electrically erasable (EEE) memory system coupled to communicate with the processor, wherein the EEE memory system includes: a memory controller; an emulated portion of memory coupled to the memory controller; and a non-volatile portion of memory coupled to the memory controller. The memory controller is configured to: upon detection of imminent power loss in the EEE memory system, enter a quick write mode for a predetermined amount of time, receive a first write request from the processor immediately subsequent to entry of the quick write mode, wherein the first write request includes a first address of the emulated portion of memory and associated first data to be written at the first address. The memory controller is also configured to: create a first new record in the non-volatile portion of memory during the quick write mode, wherein record data written to the first new record includes the first address, the associated first data, and a blank record status identifier (ID), and wherein the blank record status ID is one of a plurality of non-qualified record status identifiers (IDs). The memory controller is also configured to: in response to a determination that the record data written to the first new record passes verification, update the first new record to include a quick record status ID, wherein the quick record status ID is another one of the plurality of non-qualified record status IDs.

One aspect of the above embodiment provides that the memory controller is further configured to: in response to a determination that the record data written to the first new record fails verification, update the first new record to include an invalid record status ID, wherein the invalid record status ID is another one of the plurality of non-qualified record status IDs, create another first new record in the non-volatile portion of memory during the quick write mode, wherein record data written to the another first new record includes the first address, the associated first data, and the blank record status identifier, and in response to a determination that the record data written to the another first new record passes verification, update the another first new record to include the quick record status ID.

Another aspect of the above embodiment provides that the memory controller is further configured to: receive a second write request immediately subsequent to the first write request during the quick write mode, wherein the second write request includes a second address of the emulated portion of memory and associated second data to be written at the second address, and in response to a determination that the second write request is a last write request that can be processed by memory controller within a remaining portion of the predetermined amount of time: create a last new record in the non-volatile portion of memory during the quick write mode, wherein record data written to the last new record includes the second address, the associated second data, and the blank record status ID.

A further aspect of the above embodiment provides that the memory controller is further configured to: in response to a determination that the record data written to the last new record passes verification: update the last new record to include the quick record status ID, and release the quick write mode; and in response to a determination that the record data written to the last new record fails verification, update the final new record to include an invalid record status ID.

Another further aspect of the above embodiment provides that the memory controller is further configured to: in response to a determination that the second write request is not the last write request: create a subsequent new record in the non-volatile portion of memory during the quick write mode, wherein record data written to the subsequent new record includes the second address, the associated second data, and the blank record status ID, in response to a determination that the record data written to the subsequent new record passes verification, leave the subsequent new record to include the blank record status ID, and in response to a determination that the record data written to the subsequent new record fails verification, update the subsequent new record to include the invalid record status ID.

Another aspect of the above embodiment provides that the memory controller is further configured to: perform a copy down transfer of records from the non-volatile portion of memory to the emulated portion of memory during a full power mode, wherein the copy down transfer is initialized to transfer records that each include one of a plurality of qualified record status IDs to the emulated portion of memory, and in response to a combination of a first determination that a present record of the copy down transfer includes the quick record status ID and a second determination that a last written record of the non-volatile portion of memory includes one of a group including the plurality of qualified record status IDs and the quick record status ID: enable transfer of records that each include one of the quick record status ID and the blank record status ID to the emulated portion of memory.

A further aspect of the above embodiment provides that the memory controller is further configured to: in response to a combination of the first determination that the present record includes the quick record status ID and a third determination that the last written record of the non-volatile portion of memory does not include any of the plurality of qualified record status IDs and does not include the quick record status ID: increment a quick record count for each record subsequent to the present record until either an invalid record or a blank record is encountered, and log the quick record count and a write failure indication.

Another aspect of the above embodiment provides that the memory controller is further configured to: perform a compression operation of the records in the non-volatile portion of memory during a full power mode, and in response to a combination of a first determination that a present record of the compression operation includes the quick record status ID and a second determination that a next record includes the blank record status ID: erase any older records in the non-volatile portion of memory that are associated with an address of the present record, update the next record to include the quick record status ID, qualify the present record, and update the present record to include one of a plurality of qualified record status IDs.

A further aspect of the above embodiment provides that the memory controller is further configured to: in response to a combination of the first determination that the present record includes the quick record status ID and a third determination that the next record includes the quick record status ID: erase any older records in the non-volatile portion of memory that are associated with an address of the next record, qualify the next record, and update the next record to include one of the plurality of qualified record status IDs.

A still further aspect of the above embodiment provides that the memory controller is further configured to: in response to a combination of the first determination that the present record includes the quick record status ID, a fourth determination that the next record does not include the blank record status ID and does not include the quick record status ID, and a fifth determination that the next record includes one of the plurality of qualified record status IDs: erase any older records in the non-volatile portion of memory that are associated with an address of the present record, qualify the present record, and update the present record to include one of the plurality of qualified record status IDs.

In another embodiment of the present disclosure, a method of operating an emulated electrically erasable (EEE) memory system is provided, the method includes: entering a quick write mode for a predetermined amount of time, upon detection of imminent power loss in the EEE memory system; receiving a first write request immediately subsequent to entering the quick write mode, wherein the first write request includes a first address of an emulated memory of the EEE memory system and associated first data to be written at the first address; creating a first new record in non-volatile memory of the EEE memory system during the quick write mode, wherein record data written to the first new record includes the first address, the associated first data, and a blank record status identifier (ID), and wherein the blank record status ID is one of a plurality of non-qualified record status identifier (IDs); and updating the first new record to include a quick record status ID, in response to a determination that the record data written to the first new record passes verification, wherein the quick record status ID is another one of the plurality of non-qualified record status IDs.

One aspect of the above embodiment provides that the method further includes: receiving a second write request immediately subsequent to the first write request during the quick write mode, wherein the second write request includes a second address of the emulated memory and associated second data to be written at the second address; in response to a determination that the second write request is a last write request that can be processed within a remaining portion of the predetermined amount of time: creating a last new record in the non-volatile memory during the quick write mode, wherein record data written to the last new record includes the second address, the associated second data, and the blank record status ID; and in response to a determination that the record data written to the last new record passes verification: updating the last new record to include the quick record status ID, and releasing the quick write mode.

A further aspect of the above embodiment provides that the method further includes: in response to a determination that the second write request is not the last write request: creating a subsequent new record in the non-volatile memory during the quick write mode, wherein record data written to the subsequent new record includes the second address, the associated second data, and the blank record status ID; and in response to a determination that the record data written to the subsequent new record is valid, leaving the subsequent new record to include the blank record status ID.

Another aspect of the above embodiment provides that the method further includes: performing a copy down transfer of records from the non-volatile memory to the emulated memory during a full power mode, wherein the copy down transfer is initialized to transfer records that each include one of a plurality of qualified record status IDs to the emulated portion of memory, and in response to a combination of a first determination that a present record of the copy down transfer has the quick record status ID and a second determination that a last written record of the non-volatile portion of memory includes one of a group including the plurality of qualified record status IDs and the quick record status ID: enabling transfer of records that each include one of the quick record status ID and the blank record status ID to the emulated memory; and in response to a combination of the first determination that the present record includes the quick record status ID and a third determination that the last written record of the non-volatile portion of memory does not include any of the plurality of qualified record status IDs and does not include the quick record status ID: incrementing a quick record count for each record subsequent to the present record until either an invalid record or a blank record is encountered, and logging the quick record count and a write failure indication.

Another aspect of the above embodiment provides that the method further includes: performing a compression operation of the records in the non-volatile memory during a full power mode; and in response to a combination of a first determination that a present record of the compression operation includes the quick record status ID and a second determination that a next record includes the blank record status ID: erasing any older records in the non-volatile portion of memory that are associated with an address of the present record, updating the next record to have the quick record status ID, qualifying the present record, and updating the present record to include one of a plurality of qualified record status IDs.

A further aspect of the above embodiment provides that the method further includes: in response to a combination of the first determination that the present record includes the quick record status ID and a third determination that the next record includes the quick record status ID: erasing any older records in the non-volatile portion of memory that are associated with an address of the next record, qualifying the next record, and updating the next record to include one of the plurality of qualified record status IDs.

A still further aspect of the above embodiment provides that the method further includes: in response to a combination of the first determination that the present record includes the quick record status ID, a fourth determination that the next record does not include the blank record status ID and does not include the quick record status ID, and a fifth determination that the next record includes one of the plurality of qualified record status IDs: erasing any older records in the non-volatile portion of memory that are associated with an address of the present record, qualifying the present record, and updating the present record to include one of the plurality of qualified record status IDs.

In another embodiment of the present disclosure, a method of operating an emulated electrically erasable (EEE) memory system is provided, the method includes: entering a quick write mode, in response to detection of an imminent power loss in the EEE memory system; writing a stack of new records to non-volatile memory of the EEE memory system during the quick write mode, wherein the stack of new records are not qualified during the quick write mode, the stack of new records includes a first new record and a last new record, and the first new record and the last new record each include a quick record status identifier (ID); exiting the quick write mode, subsequent to the writing the stack of new records; entering a full power mode upon power up of the EEE memory system subsequent to exiting the quick write mode; and qualifying the stack of new records during the full power mode.

One aspect of the above embodiment provides that the stack of new records includes a set of intermediate new records between the first new record and the last new record, and each of the set of intermediate new records include a blank record status ID.

A further aspect of the above embodiment provides that the method further includes: performing a copy down transfer of the stack of new records from the non-volatile memory to emulated memory of the EEE memory system during the full power mode, wherein the copy down transfer is enabled to transfer records including the quick record status ID and the blank record status ID to the emulated memory.

The circuitry described herein may be implemented on a semiconductor substrate, which can be any semiconductor material or combinations of materials, such as gallium arsenide, silicon germanium, silicon-on-insulator (SOI), silicon, monocrystalline silicon, the like, and combinations of the above.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, NVM array 135 may be located on a same integrated circuit as memory controller 130 or on a separate integrated circuit or located within another peripheral or slave discretely separate from other elements of system 100. Other modules 115 may also be located on separate integrated circuits or devices. Also for example, system 100 or portions thereof may be soft or code representations of physical circuitry or of logical representations convertible into physical circuitry. As such, system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A processing system comprising:
a processor;
an emulated electrically erasable (EEE) memory system coupled to communicate with the processor, wherein the EEE memory system includes:
a memory controller;
an emulated portion of memory coupled to the memory controller; and
a non-volatile portion of memory coupled to the memory controller, wherein
the non-volatile portion of memory stores one or more qualified records and a stack of quick records,
the one or more qualified records each comprise one of a number of qualified record status identifiers (IDs) that indicate the one or more qualified records have been qualified by the memory controller using a plurality of program steps during a full power mode,
the stack of quick records comprises at least a first quick record, and
the first quick record comprises a quick record status identifier (ID) that indicates the stack of quick records was written by the memory controller to the non-volatile portion of memory during a quick write mode triggered by detection of an imminent power failure and has not been qualified;
wherein during a next full power mode after the quick write mode, the memory controller is configured to:
identify the first quick record of the stack of quick records as a present record,
determine a record status of a next record after the present record in the non-volatile portion of memory, and
in response to a determination that the next record has a blank record status ID:
update the next record from the blank record status ID to the quick record status ID, wherein the blank record status ID indicates that the next record is part of the stack of quick records, and
qualify the present record using the plurality of program steps.

2. The processing system of claim 1, wherein during the next full power mode after the quick write mode, the memory controller is further configured to:
search for and erase any older records in the non-volatile portion of memory that are associated with an address of the present record.

3. The processing system of claim 1, wherein during the next full power mode after the quick write mode, the memory controller is further configured to:
update the qualified present record from the quick record status ID to one of the number of qualified record status IDs.

4. The processing system of claim 1, wherein during the next full power mode after the quick write mode, the memory controller is further configured to:
identify the next record having the quick record status ID as the present record, and
determine the record status of another next record after the present record.

5. The processing system of claim 1, wherein during the next full power mode after the quick write mode, the memory controller is further configured to:
in response to a determination that the next record has the quick record status ID:
qualify the next record using the plurality of program steps.

6. The processing system of claim 5, wherein during the next full power mode after the quick write mode, the memory controller is further configured to:
search for and erase any older records in the non-volatile portion of memory that are associated with an address of the next record.

7. The processing system of claim 5, wherein during the next full power mode after the quick write mode, the memory controller is further configured to:
update the qualified next record to have one of the qualified record status IDs.

8. The processing system of claim 5, wherein during the next full power mode after the quick write mode, the memory controller is further configured to:
continue to identify the first quick record as the present record after the next record has been qualified, and
in response to a determination that the next record has one of the qualified record status IDs:
qualify the present record using the plurality of program steps.

9. The processing system of claim 8, wherein during the next full power mode after the quick write mode, the memory controller is further configured to:
update the qualified present record to have one of the qualified record status IDs.

10. The processing system of claim 1, wherein during the next full power mode after the quick write mode, the memory controller is further configured to:
in response to a determination that the next record does not have the blank record status ID, the quick record status ID, or one of the qualified record status IDs, update the present record from the quick record status ID to an invalid record status ID.

11. A processing system comprising:
a processor;
an emulated electrically erasable (EEE) memory system coupled to communicate with the processor, wherein the EEE memory system includes:
a memory controller;
an emulated portion of memory coupled to the memory controller; and
a non-volatile portion of memory coupled to the memory controller, wherein
the non-volatile portion of memory stores one or more qualified records and a stack of quick records,
the one or more qualified records each comprise one of a number of qualified record status identifiers (IDs) that indicate the one or more qualified records have been qualified by the memory controller using a plurality of program steps during a full power mode,
the stack of quick records comprises at least a first quick record, and
the first quick record comprises a quick record status identifier (ID) that indicates the stack of quick records was written by the memory controller to the non-volatile power of memory during a quick write mode triggered by detection of an imminent power failure and has not been qualified;

wherein during a next full power mode after the quick write mode, the memory controller is configured to:
identify the first quick record of the stack of quick records as a present record,
determine a record status of a last written record in the non-volatile portion of memory, and
in response to a determination that the last written record has a quick record status ID or one of the qualified record status IDs:
copy down the one or more qualified records and the stack of quick records from the non-volatile portion of memory to the emulated portion of memory.

12. The processing system of claim 11, wherein during the next full power mode after the quick write mode, the memory controller is further configured to:
in response to a determination that the last written record does not have either the quick record status ID or one of the qualified record status IDs:
counting a number of quick records included in the stack of quick records, and
logging the number with an indication the quick write mode failed.

13. The processing system of claim 11, wherein
the stack of records further comprises a last quick record and a number of intervening records between the first quick record and the last quick record,
the last quick record comprises the quick record status ID, and
the intervening records each comprise a blank record status ID.

14. The processing system of claim 13, wherein during the next full power mode after the quick write mode, the memory controller is further configured to:
enable copy down of records that have either the quick record status ID or the blank record status ID to begin copy down of the first quick record, and
disable copy down of records that have either the quick record status ID or the blank record status ID after the last quick record has been copied down.

15. The processing system of claim 13, wherein during the next full power mode after the quick write mode, the memory controller is further configured to:
skip copy down of a record having the blank record status ID that is not one of the intervening records of the stack of quick records.

16. A method of operating an emulated electrically erasable (EEE) memory system during a present full power mode, the EEE memory system comprising a memory controller coupled to a non-volatile portion of memory, the method comprising:
identifying, by the memory controller, a first quick record of a stack of quick records as a present record, wherein the stack of quick records is stored in the non-volatile portion of memory,
the stack of quick records comprises at least the first quick record having a quick record status identifier (ID) that indicates the stack of quick records was written by the memory controller to the non-volatile portion of memory during a previous quick write mode triggered by detection of an imminent power failure and has not been qualified;
the non-volatile portion of memory further stores one or more qualified records that each comprise one of a number of qualified record status identifiers (IDs) that indicate the one or more qualified records have been qualified by the memory controller using a plurality of program steps during a previous full power mode;
determining, by the memory controller, a record status of a next record after the present record in the non-volatile portion of memory; and
in response to a determination that the next record has a blank record status ID:
updating, by the memory controller, the next record from the blank record status ID to the quick record status ID, wherein the blank record status ID indicates that the next record is part of the stack of quick records, and
qualifying, by the memory controller, the present record using the plurality of program steps.

17. The method of claim 16, further comprising:
identifying the next record having the quick record status ID as the present record, and
determining the record status of another next record after the present record.

18. The method of claim 16, further comprising:
in response to a determination that the next record has the quick record status ID:
qualifying the next record using the plurality of program steps.

19. The method of claim 18, further comprising:
continue identifying the first quick record as the present record after the next record has been qualified, and
in response to a determination that the next record has one of the qualified record status IDs:
qualifying the present record using the plurality of program steps.

20. The method of claim 16, further comprising:
in response to a determination that the next record does not have the blank record status ID, the quick record status ID, or one of the qualified record status IDs, updating the present record from the quick record status ID to an invalid record status ID.

* * * * *